G. W. MOORE.
CLUTCH.
APPLICATION FILED MAR. 8, 1913.

1,143,298.

Patented June 15, 1915.

Witnesses
Frank R Glon

Inventor
G. W. Moore
By George W. Thorpe Atty.

UNITED STATES PATENT OFFICE.

GEORGE W. MOORE, OF TULSA, OKLAHOMA, ASSIGNOR TO IMPERIAL MANUFACTURING COMPANY, OF TULSA, OKLAHOMA, A CORPORATION OF KANSAS.

CLUTCH.

1,143,298.  Specification of Letters Patent.  Patented June 15, 1915.

Application filed March 8, 1913. Serial No. 753,055.

*To all whom it may concern:*

Be it known that I, GEORGE W. MOORE, a citizen of the United States, residing at Tulsa, in the State of Oklahoma, have invented certain new and useful Improvements in Clutches, of which the following is a specification.

This invention relates to a clutching device and my object is to provide an improved arrangement and construction of clutch parts such that the clutching action thereof will not be so abrupt as in the usual jaw clutch but will be sufficiently gradual to overcome the shock usually incurred in starting.

My invention is particularly adaptable to washing machines, for example those of the oscillatory drum type in which the drum is oscillated from a continuously driven shaft. This shaft, in imparting initial movement to the drum and its contents, is subjected to abrupt strains which are largely overcome by the use of such a device as my invention contemplates.

With this general object in view, my invention consists in certain peculiar features of construction and arrangement as will appear in the following description of one of its embodiments in connection with a washing machine of the above-mentioned type, reference being made to the drawings, in which—

Figure 1:
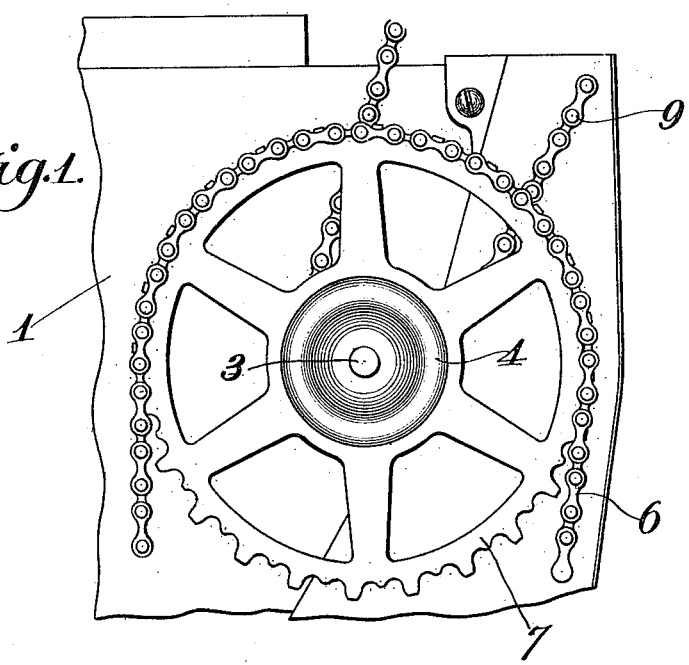
Figure 2:
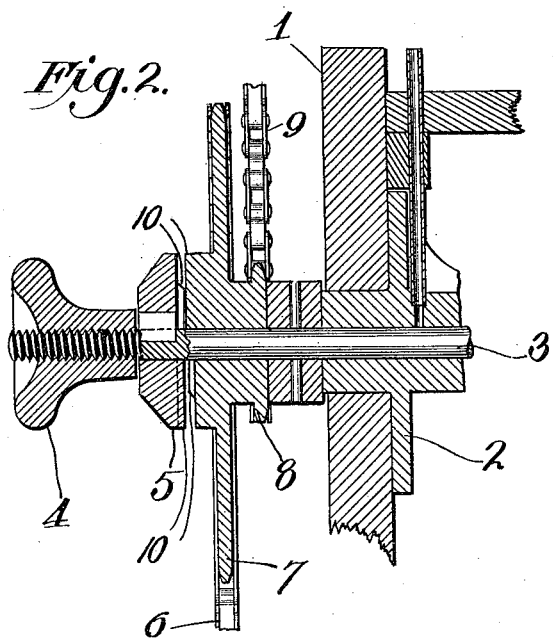
Figure 3:
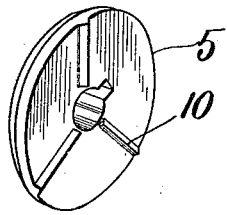

Figure 1, is a side elevation of my invention shown in connection with so much of a washing machine as is required to illustrate the principle of my clutch. Fig. 2, is a vertical section through the same. Fig. 3, is a perspective view of one of the clutch members.

In the drawing, one of the side walls 1 of a washing machine is illustrated as provided with a bearing 2 for one end of a drum-driving shaft 3. Threaded on the end of said shaft is a nut 4 for taking against the outer clutch member 5, when it is desired to impart motion to the shaft 3, power being derived from any suitable source and received through a sprocket chain 6 riding over a sprocket wheel 7 also mounted on shaft 3. On one end of the hub of this sprocket wheel 7 is formed a sprocket 8 for driving a chain 9, which operates the wringer (not shown) while the opposite end of the hub is formed with a clutch face, which acts with a complemental similarly formed face upon the part 5. It should be noted that the sprocket wheel is loosely mounted on the shaft while the part 5 is keyed slidingly thereto. Upon the adjacent faces of the part 5 and the sprocket hub are formed radially extending ribs 10 spaced apart and of V-shape in cross section and in practice I find that three of such ribs on each clutch part will answer my purpose.

When it is desired to transmit power from the drive chain 6 to the shaft 3, to operate the washing machine, the part 5 is moved into contact with the hub by turning the nut 4, the ribs of one part are forced into slight binding engagement with the flat portion of the opposing face and thereafter if the sprocket turns the shaft 3 will be started first by the frictional drag of the ribs against said flat surface and then by the positive clutching action when the ribs of one member engage with those of the other. When it is desired to arrest the shaft 3, the operator unscrews the nut 4, so that the resistance offered by the washing machine through shaft 3 and clutch part 5 shall positively and instantly effect disengagement of the latter from the clutch part of sprocket wheel 7, it being noted that this action is positive because the engaging faces of the ribs 10 are inclined, and that it is instantaneous because the use of such faces results in the driven one pushing the other one out of its path. It will therefore be seen that the operation of the washing machine ceases the instant the nut 4 is unscrewed a distance equal to the depth of one of the clutch ribs.

While I have illustrated and described above one practical form of my invention, I reserve the right to make such changes as may fall within the scope of the following claim.

I claim:—

In a clutching device, a journaled shaft, a driven wheel journaled on said shaft and provided with one or more radial ribs formed on one end of the hub of the driven wheel, a clutch member keyed slidingly on the shaft outward of the said ribs and provided on its inner face with one or more radially extending ribs V-shape in cross section, a threaded extension for the shaft, and a nut mounted on the threaded extension and adapted when screwed inwardly thereon to force the clutch member toward the hub of the wheel until the said ribs occupy the same rotary path and when unscrewed to permit the ribs of such wheel by pressure on the ribs of said clutch member to force the latter outwardly until its ribs are entirely withdrawn from the path of the ribs of said wheel.

In testimony whereof I affix my signature in presence of two witnesses.

GEORGE W. MOORE.

Witnesses:
E. E. STAFFORD,
J. S. HOUT.

Copies of this patent may be obtained for five cents each, by addressing the "Commissioner of Patents, Washington, D. C."